United States Patent Office 3,025,312
Patented Mar. 13, 1962

3,025,312
9α,11β-DICHLORO PREGNANES
Josef Fried, Princeton, N.J., and Josef Edward Herz, Mexico City, Mexico, assignors to Olin Mathieson Chemical Corporation, New York, N.Y., a corporation of Virginia
No Drawing. Filed July 14, 1959, Ser. No. 826,932
1 Claim. (Cl. 260—397.45)

This application is a continuation-in-part of our parent applications, Serial No. 429,104, filed May 11, 1954, now abandoned, and Serial No. 779,302, filed December 10, 1958.

This invention relates to a new process for synthesizing valuable steroids.

An object of this invention is the provision of an advantageous process for introducing chloro groups into the 9α and 11β positions of a $\Delta^{9(11)}$-steroid.

Another object of this invention is the provision of new 9α,11β-dichloro steroids, useful both as intermediates in the preparation of the corresponding 9α-chloro-11β-hydroxy steroid derivatives and per se as physiologically active steroidal substances which possess anti-inflammatory activity and hence can be used in lieu of known anti-inflammatory steroids, such as hydrocortisone, in the treatment of rheumatoid arthritis, asthma, etc.

The process of this invention essentially comprises reacting a $\Delta^{9(11)}$-steroid with hypochlorous acid and recovering the 9α,11β-dichloro steroid produced.

Steroids useful as starting materials in the practice of the process of this invention include members of the $\Delta^{9(11)}$-androstene (including the $\Delta^{9(11)}$-etiocholene) and the $\Delta^{9(11)}$-pregnene (including the $\Delta^{9(11)}$-allopregnene) series; the preferred compounds belonging to the $\Delta^{9(11)}$-pregnene series, which includes $\Delta^{4,9(11)}$-pregnadiene and $\Delta^{1,4,9(11)}$-pregnatriene compounds. The specifically preferred compounds of the $\Delta^{9(11)}$-pregnene series are those of the general formula:

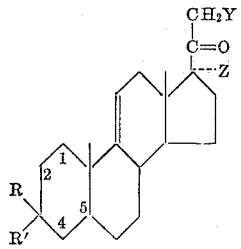

wherein the 1,2- and 4,5-positions are double-bonded or saturated, R is —H, R' is —OH, or together R and R' is =O or a group convertible thereto by hydrolysis (such as a ketal group); Y is —H, halogen, —OH, or —OR'''; and Z is either —H or (α)-OH; R''' being an organic radical such as an acyl radical (acetyl, benzoyl, naphthoyl, etc.), an aliphatic radical (methyl, ethyl, etc.) or an aralkyl radical (benzyl, phenethyl, etc.)

The resulting compounds have the general formula:

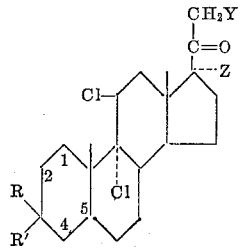

wherein the 1,2- and 4,5-positions are double-bonded or saturated as before, and R, R', Y, and Z are as hereinbefore defined.

In addition to their use as anti-inflammatory agents, the 9α,11β-dichloro steroids of this invention are useful as intermediates in the preparation of the corresponding 9α-chloro-11β-hydroxy steroid derivatives as more fully detailed in Example 1 hereinafter.

Suitable chlorinating agents for the conversion of $\Delta^{9(11)}$-steroids to the corresponding 9α,11β-dichloro derivatives include preferably hypochlorous acid and N-chloroamides or N-chloro-imides of carboxylic acids (including derivatives thereof), such as N-chloroacetamide.

The hypochlorous acid used for the conversion of the $\Delta^{9(11)}$-steroids to the corresponding 9α,11β-dichloro derivatives is preferably employed as such, but also may be formed in situ by interacting an N-chloro-amide or N-chloro-imide of a carboxylic acid (including derivatives thereof) with water. Suitable N-chloro-amides and N-chloro-imides include N-chloroacetamide (or N-chloroamides of other fatty acids), N-chlorosuccinimide (or other cyclic imides of amino fatty acids), and N,N-dichlorodimethylhydantoin. As previously stated, if such an N-chloroamide or N-chloro-imide is employed, water must be present in the reaction medium. The reaction medium preferably also includes an inert solvent for the steroid reactant. Representative of such solvents are the tertiary alcohols (such as tertiary butanol), ethers (such as acyclic ethers, e.g. diethyl ether and methyl isopropyl ether or cyclic esters, e.g. dioxane), and certain ketones.

The following examples are illustrative of the invention:

EXAMPLE I

9α-Chlorohydrocortisone Acetate and (9α,11β-Dichloro-$\Delta^4$-Pregnene-17α,21-Diol-3,20-Dione 21-Acetate From $\Delta^{4,9(11)}$-Pregnadiene-17α,21-Diol-3,20-Dione 21-Acetate 246 mg. of finely pulverized $\Delta^{4,9(11)}$-pregnadiene-17α-21-diol-3,20-dione 21-acetate is dissolved in 50 ml. of hot dioxane and after adding 5 ml. of water, the solution is rapidly cooled to room temperature while agitating. To the resulting suspension is added 268 mg. of N,N-dichlorodimethylhydantoin and 5 ml. of 1 N perchloric acid, and the reaction is allowed to proceed at room temperature for two and one-half hours. Excess N,N-dichlorodimethylhydantoin is then destroyed by the addition of dilute aqueous sodium sulfite. 50 ml. of chloroform is added, and the small aqueous phase floating on top is separated off. The chloroform-dioxane phase is washed with dilute sodium bicarbonate and with water and dried over sodium sulfate. Removal of the solvents in vacuo leaves a readily crystallizing residue (about 330 mg.). A small portion of the residue is recrystallized for analysis from acetone, M.P. about 241° C. (dec.).

Analysis.—Calcd. for $C_{23}H_{28}O_5Cl_2$ (455.36): C, 60.66; H, 6.19; Cl, 15.57. Found: C, 60.88; H, 6.60; Cl, 15.41.

The above compound represents 9α-11β-dichloro-$\Delta^4$-pregnene-17α,21-diol-3,20-dione 21-acetate.

The total mixture obtained above is dissolved in 5 ml. of dioxane and treated at room temperature with 2 ml. of an aqueous solution of chromous chloride [prepared as described in the J. American Chemical Society, 72, 4080 (1950)]. After 30 minutes the reaction mixture is aerated to oxidize the remaining chromous chloride to chromic chloride and 20 ml. of chloroform is added. After separation of the layers, the chloroform-dioxane extract is washed with water, dilute sodium bicarbonate, and again with water and finally dried over sodium sulfate. Removal of the solvents in vacuo leaves a residue (about 286 mg.) which crystallizes spontaneously. Since this product is a mixture, it is chromatographed on 6 g. of silica gel. Elution with chloroform yields $\Delta^{4,9(11)}$ - pregnadiene - 17α,21 - diol - 3,20 - dione 21-acetate (about 110 mg.), which after recrystallization from acetone melts at about 234–236° C. A mixed melting point with an authentic sample of that substance shows no depression. Subsequent elution of the column with 5% acetone in chloroform affords 9α-chlorohydrocortisone acetate (about 100 mg.) which after crystallization, first from acetone-hexane and finally from acetone, melts at about 202° C. (dec.). Infrared comparison with an authentic sample of 9α-chlorohydrocortisone acetate shows the two to be identical.

EXAMPLE 2

*9α,11β-Dichloro-Δ⁴-Pregnene-17α,21-Diol-3,20-Dione 21-Acetate*

To a suspension of 400 mg. of $\Delta^{4,9(11)}$-pregnadiene-17α,21-diol-3,20-dione 21-acetate in 40 ml. of dioxane and 4 ml. of water is added at room temperature 2.5 ml. of an 0.61 N aqueous solution of hypochlorous acid (prepared by saturating a 10% solution of sodium bicarbonate with chlorine at 0° and adjusting the pH of the resulting solution with sodium hydroxide to 6.7). The suspension clears within 2 minutes, and 20 minutes later excess hypochlorous acid is destroyed by the addition of sodium sulfite solution. 150 ml. of chloroform is added, the phases are separated and the chloroform solution washed with water. After drying over sodium sulfate the solvent is removed in vacuo. The crystalline residue of 9α,11β-dichloro-Δ⁴-pregnene-17α,21-diol-3,20-dione 21-acetate after recrystallization from acetone has the following properties: M.P. about 243–244° C. (dec.); $[\alpha]_D^{23}+164°$ (c. 1.07 in $CHCl_3$);

$$\lambda_{max.}^{alc.} \ 238 m\mu \ (\epsilon = 15{,}600)$$

*Analysis.*—Calcd. for $C_{23}H_{30}O_5Cl_2$: C, 60.3; H, 6.62; Cl, 15.55. Found: C, 60.36; H, 6.68; Cl, 13.38.

EXAMPLE 3

*9α,11β-Dichloro-17α-Hydroxyprogesterone*

Following the procedure of Example 2, but substituting an equivalent amount of $\Delta^{4,9(11)}$-pregnadiene-17α-ol-3,20-dione for the $\Delta^{4,9(11)}$-pregnadiene-17α,21-diol-3,20-dione 21 - acetate, 9α-11β-dichloro-17α-hydroxyprogesterone is obtained.

EXAMPLE 4

*9α,11β-Dichloroprogesterone*

Following the procedure of Example 2, but substituting an equivalent amount of $\Delta^{4,9(11)}$-pregnadiene-3,20-dione for the $\Delta^{4,9(11)}$-pregnadiene-17α,21-diol-3,20-dione 21-acetate, 9α,11β-dichloroprogesterone is obtained.

EXAMPLE 5

*9α,11β-Dichloro-Δ⁴-Pregnene-21-ol-3,20-Dione 21-Acetate*

Following the procedure of Example 2, but substituting an equivalent amount of $\Delta^{4,9(11)}$-pregnadiene-21-ol-3,20-dione 21-acetate for the $\Delta^{4,9(11)}$-pregnadiene-17α,21-diol-3,20-dione 21-acetate, 9α,11β-dichloro-Δ⁴-pregnene-21-ol-3,20-dione 21-acetate is produced.

EXAMPLE 6

*9α,11β-Dichloro-Δ⁴-Pregnene-17α,21-Diol-3,20-Dione*

Following the procedure of Example 2, but substituting $\Delta^{4,9(11)}$pregnadiene-17α,21-diol-3,20-dione for the 21-acetate, 9α,11β-dichloro-Δ⁴-pregnene-17α,21-diol-3,20-dione is formed.

EXAMPLE 7

*9α,11β-Dichloro-Δ¹,⁴-Pregnadiene-17α,21-Diol-3,20-Dione 21-Acetate*

Following the procedure of Example 2, but substituting an equivalent amount of $\Delta^{1,4,9(11)}$-pregnatriene-17α,21-diol-3,20-dione 21-acetate for the $\Delta^{4,9(11)}$-pregnadiene-17α,21-diol-3,20-dione 21-acetate, 9α,11β-dichloro-Δ¹,⁴-pregnadiene-17α,21-diol-3,20-dione 21-acetate is obtained.

The invention may be variously otherwise embodied within the scope of the appended claim.

What is claimed is:

9α,11β-dichloro - Δ⁴ - pregnene-21-ol-3,20-dione 21-acetate.

References Cited in the file of this patent

UNITED STATES PATENTS 2,707,190    Farrar  ---------------- Apr. 26, 1955
2,894,963    Gould et al.  ------------ July 14, 1959

OTHER REFERENCES

Robinson et al.: J. Am. Chem. Soc., vol. 81 (May 5, 1959), pages 2191–2195.